March 10, 1959  H. S. LASHER, JR  2,877,383
ELECTRICAL PULSE PRODUCING CIRCUITS
Filed March 10, 1958

Inventor:
Hiram S. Lasher Jr.,
by Richard R. Brainard
His Attorney.

United States Patent Office 2,877,383
Patented Mar. 10, 1959

2,877,383
ELECTRICAL PULSE PRODUCING CIRCUITS

Hiram S. Lasher, Jr., Schenectady, N. Y., assignor to General Electric Company, a corporation of New York Application March 10, 1958, Serial No. 720,208

3 Claims. (Cl. 315—166)

My invention relates to circuits for the production of pulses of electrical energy and more particularly to improved circuits for producing electrical pulses from gaseous discharge tubes which have a long duration compared to the pulse duration permitted by the ratings of a single tube.

Many gaseous discharge tubes have a definite time limitation on their length of conduction. This time limit, in general, is determined by the cathode emission capabilities of the particular tube employed. For a particular hydrogen filled pulse type thyratron tube (a 3C45), by way of example, this limit is approximately six microseconds in length. In applications requiring a pulse of longer duration there is a need for improved circuits for producing composite pulses from a number of parallel connected discharge devices.

It is an object of my invention to provide an improved circuit for the production of a composite pulse of electrical energy which exceeds, in time duration, the length of pulse obtainable from a single gaseous discharge tube.

It is the further object of my invention to provide an improved control circuit for the production of a composite pulse of electrical energy which is of adjustable duration.

In accordance with the illustrated embodiment of my invention, composite voltage pulses of long duration, compared to the conduction period of a single tube, are provided by a plurality of tubes connected in cascade and controlled to conduct in succession during adjacent intervals of time to supply contiguous pulses to a single load circuit. Each tube except the first is rendered conductive by means of a resonant circuit coupled to the grid of that tube and also to the cathode circuit of the preceding tube of the cascade arrangement. The resonant circuit is shock-excited by the leading edge of the current pulse conducted by the tube in the cathode circuit of which it is connected. The characteristic damped oscillation appearing across the resonant circuit is applied to the grid of the second tube to render that tube conductive when the oscillation first swings positive. The periodicity of the resonant circuit is selected so that it starts to swing positive and renders the succeeding tube conductive at the end of the conduction period of the preceding tube, the cessation of conduction being determined by suitable commutating means of a type well known in the art. Composite pulses produced in this manner may therefore be equal in duration to any desired multiple of the duration of the conduction period of a single tube, dependent upon the number of tubes connected in cascade.

Objects and advantages of my invention, in addition to those already described, will become more apparent from the following description taken in connection with the accompanying drawing and its scope will be pointed out in the appended claims.

In the drawing, Figure 1 is a schematic representation of a circuit embodying my invention;

Figure 1:
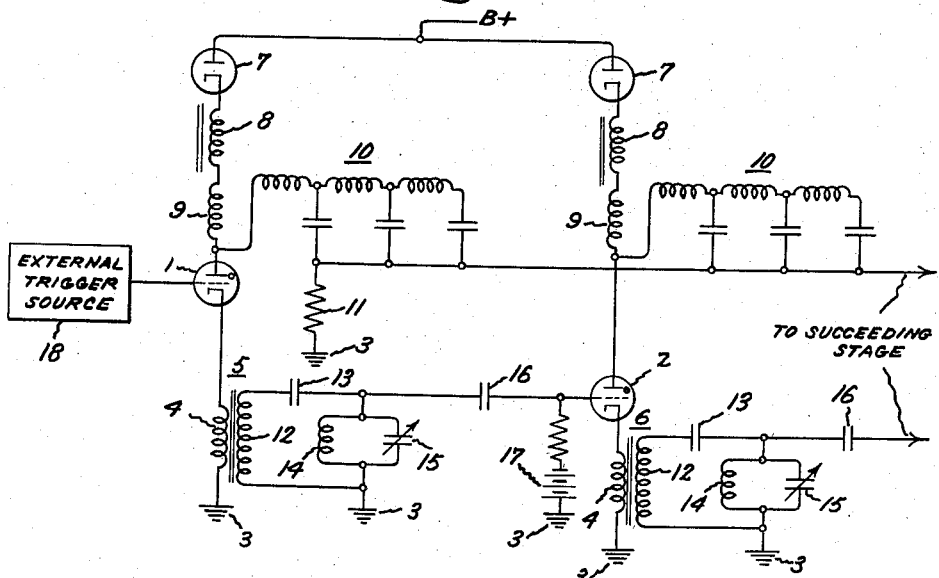

In Figure 1 of the drawing I have shown my invention applied to a two-stage cascade circuit of gaseous discharge devices for producing a composite pulse in response to a trigger or signal voltage and having a duration up to twice the permissible period of conduction of the individual discharge tubes used in each of the two stages. Referring now to Figure 1 I have shown my invention embodied in a circuit in which two gaseous discharge devices, 1 and 2, have their anode-cathode circuits connected in parallel and to a source of positive direct current voltage designated B+. The respective cathodes are connected to ground, as indicated at 3, through the primary windings 4 of high ratio current pulse transformers 5 and 6. The positive direct current supply voltage is connected with the anodes of the devices 1 and 2, respectively, through parallel circuits each including a unilaterally conducting device 7, an iron core inductance 8 (audio choke) and an air core inductance 9 (radio frequency choke). The common terminal of inductances 9 and the anodes of devices 1 and 2 are connected, respectively, to the input terminal of a delay line designated generally by the numeral 10. This same terminal of each of the stages is connected through a load or output resistor 11 to ground through the input end of the delay line.

For the purpose of energizing the control member of each succeeding stage in accordance with the initiation of conduction of the preceding stage, the pulse current transformers 5 and 6 of the stages are each provided with a secondary winding 12 which is connected to energize a parallel tuned circuit connected thereacross through a blocking capacitor 13 and including an inductor 14 and capacitor 15, either one of which may be made adjustable for controlling the frequency to which the parallel circuit is tuned. The output of the tuned circuit is connected to the control grid of the discharge device 2 of the next succeeding stage through a blocking capacitor 16. In this manner, the voltage of the tuned circuit is impressed on the control member which is provided with a steady state negative bias in any suitable manner as by a biasing battery 17. The coupling between the cathode circuit of the discharge device 2 and the control member of the gas discharge valve in the next succeeding stage (not shown) also includes a current transformer and tuned circuit as just described.

The operation of the pulse generating circuit thus far described may be controlled by a suitable signal or trigger source illustrated diagrammatically at 18 and connected to energize the control member of the device 1. This signal source may, for example, be a rectangular pulse of a few microseconds duration (e. g. 4 microseconds) and a magnitude of one hundred fifty volts or so as shown at $E_T$ in Figure 2.

Figure 2:
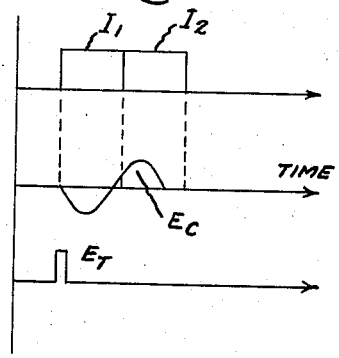
Figure 2 represents the output and resonant circuit wave forms present in the embodiment of my invention illustrated in Figure 1.

The manner in which the embodiment of my invention just described operates to produce a pulse of electrical energy having a duration greater than the permissive conduction period of a single discharge device will now be described. With the circuit energized from the direct current supply and with the filaments (not shown) of the discharge devices suitably heated the initiation of conduction of the first stage is accomplished by the occurrence of a positive voltage pulse in the trigger circuit. As the control member of the discharge tube 1 becomes more positive than the critical voltage of the tube energy previously stored in the delay line 10 as a result of charging from the B+ supply through device 7 and inductances 8 and 9 is discharged through the discharge device 1 and the primary winding 4 of the pulse transformer 5. This current pulse indicated at I₁ of Figure 2 is transmitted through a circuit completed through ground and the load resistor 11. The pulse through the primary winding 4 also shock excites the parallel tuned circuit including inductor 14 and capacitor 15. The polarity of the transformer windings is such that the oscillatory voltage wave produced across the parallel tuned circuit is initiated on a negative half cycle with respect to the cathode of the discharge tube 2 as shown at $E_c$ in Figure 2. As the second or positive half cycle of this voltage progresses it will at a definite time overcome the negative bias of the battery 17 and render the discharge tube 2 conducting. The instant that discharge tube 2 is rendered conducting and the instant that current to discharge device 1 is terminated are adjusted to coincide so that both pulses are supplied to the load as a continuous pulse of a duration equal to the sum of the individual pulses of devices 1 and 2. As just indicated, the initiation of the pulse of current through device 2 is controlled by controlling the period of oscillation of the parallel resonant circuit. The termination of conduction by device 1 is determined by the parameters of the delay line 10 which supplies the energy for the discharge through device 1. The use of delay lines for this purpose is well understood and the time may be controlled either by the constants of the inductances and capacitances or the number of sections in the delay line.

In a similar way conduction through the discharge device 2 is terminated after a predetermined time dependent upon the parameters of the delay line 10 associated with that discharge path. It will be appreciated that the overall or total duration of the energization of the load may be increased by increasing the number of stages and that the periods of conduction are made adjacent to produce a relatively smooth square top voltage or energy pulse having a duration equal to the sum of the conduction periods of the individual devices. As apparent from the inspection of Figure 2 of the drawing the essentially sine wave of voltage shown at $E_c$ represents voltage of the tuned circuit including conductor 13 and capacitor 14. The period of this voltage is made slightly less than the time interval for conduction of the tube 1 determined by the delay line 10 so that the positive half wave of the oscillatory voltage will have exceeded the negative bias of battery 17 on the control member of the discharge tube 2 sufficiently to render it in condition for conduction at the time that the discharge through the tube 1 is extinguished. In this way, the present invention provides a simple and reliable circuit for producing pulses of any desired duration independently of limitations which would otherwise be imposed by the permissive conduction period of individual gaseous discharge devices.

Figure 3:
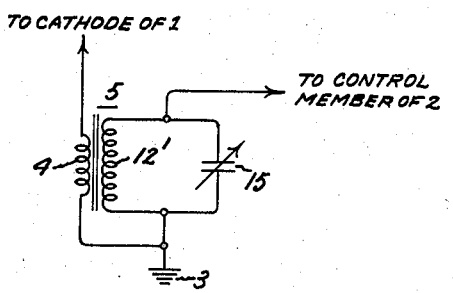
Figure 3 represents a modification of my invention.

In Figure 3 there is shown a schematic representation of a coupling circuit between the cathode circuit of one stage and the control member of the succeeding stage which is essentially the same as that shown in Figure 1 except that inductance 14 as a separate component has been eliminated and the inductance of the secondary winding 12' of the pulse transformer utilized as the inductance of the tuned circuit.

Figure 4:
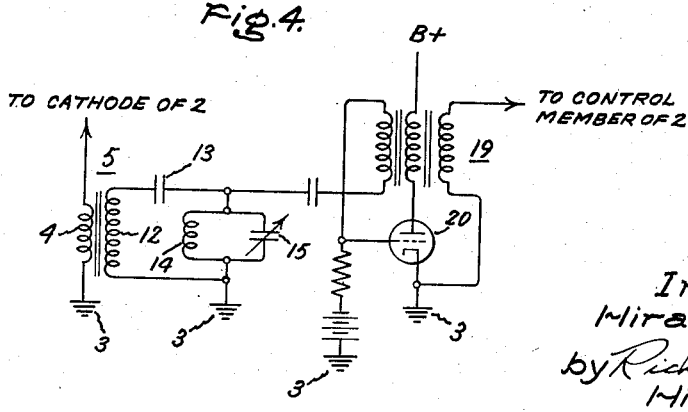
Figure 4 represents a further modification of my invention.

In some cases it may be desirable to use the output of the oscillatory circuit coupled with a preceding stage to control a circuit intermediate the oscillatory circuit and the control member of the succeeding stage. This is particularly true where the period of the oscillatory circuit increases and rate of rise of the voltage is not rapid enough to provide an accurately reproducible instant of firing for the succeeding stage. In Figure 4 I have shown a modification which is similar to that shown in Figure 1 except that a blocking oscillator designated generally by numeral 19 is interposed between the output of the tuned circuit including the inductor 14 and capacitor 15 and the control member of the discharge tube of the succeeding stage. As shown, the voltage of the tuned circuit is applied to the control member circuit of a high vacuum discharge device 20, having the anode-cathode circuit energized from the same B+ supply as employed to energize the anode-cathode circuits of discharge devices 1 and 2. As will be readily appreciated by those skilled in the art, the blocking oscillator produces a steep front wave in response to the output of the tuned circuit, 14, 15, and initiates conduction of the succeeding stage.

While I have described and illustrated particular embodiments of my invention it will be apparent to those skilled in the art that changes and modifications may be made without departing from my invention in its broader aspects and I aim, therefore, in the appended claims to cover all such changes and modifications as fall within the true spirit and scope of my invention.

What I claim as new and desire to secure by Letters Patent of the United States is:

1. An electronic circuit comprising a first gaseous discharge tube, a second gaseous discharge tube having a control element, said first gaseous discharge tube having its space discharge path connected in parallel circuit relation with the space discharge path of said second gaseous discharge tube, and a circuit including a parallel resonant circuit interconnecting the space discharge path of the first gaseous discharge tube and the control element of the second gaseous discharge tube, means interrupting the flow of current through said first gaseous discharge tube after a predetermined conduction period, said parallel resonant circuit having a natural frequency whose time period for one half cycle is substantially equal to but less than the conduction period of said first gaseous discharge tube to render said second gaseous discharge tube conducting coincident with the cessation of conduction of said first gaseous discharge tube and a single load circuit connected to be energized by contiguous pulses of the same polarity in response to conduction of said first and second discharge tubes.

2. An electronic circuit comprising a first gaseous discharge tube, a second gaseous discharge tube having a control element, said first gaseous discharge tube having its space discharge path connected in parallel circuit relation with the space discharge path of said second gaseous discharge tube, means interrupting the flow of current through said first gaseous discharge tube after a predetermined conduction period, and a circuit including a circuit including a parallel resonant circuit interconnecting the space discharge path of the first gaseous discharge tube and the control element of the second gaseous discharge tube, said parallel resonant circuit having a natural frequency whose time period for one half cycle is less than said predetermined conduction time of said first gaseous discharge tube so that the leading edge of the conduction pulse of said first gaseous discharge tube shock excites the parallel resonant circuit with a negative going pulse which, when it swings positive, renders said second gaseous discharge tube conductive, a load circuit connected to both of said discharge tubes to be energized by contiguous pulses of the same polarity in response to the successive conduction by said first and second gaseous discharge tubes to provide an output pulse having a duration equal to the sum of the conduction period of said gaseous discharge tubes.

3. An electronic circuit comprising a plurality of gaseous discharge tubes, means connecting the discharge paths of all of said tubes in parallel circuit relation and for energization from a direct current voltage supply, means coupled with each discharge path for interrupting the flow of current through each of said discharge paths after a predetermined conduction period, and a circuit for rendering said discharge tubes conductive in sequence including a parallel resonant circuit interconnecting the space discharge path of each preceding discharge tube with the control element of the succeeeding gaseous discharge tube, said parallel resonant circuits having a natural frequency whose time period for one half cycle is less than the predetermined conduction time of said preceding gaseous discharge tube so that the leading edge of the conduction pulse of said preceding gaseous discharge tube shock excites the parallel resonant circuit with a negative going pulse which, when it swings positive, renders said succeeding gaseous discharge tube conductive, a load circuit connected to all of said discharge tubes to be energized by contiguous pulses of the same polarity in response to the successive conduction by said gaseous discharge tubes to provide an output pulse having a duration equal to the sum of the conduction period of said gaseous discharge tubes.

No references cited.